United States Patent [11] 3,612,773

[72] Inventor Charles E. Riehm, Jr.
Indianapolis, Ind.
[21] Appl. No. 843,321
[22] Filed July 22, 1969
[45] Patented Oct. 12, 1971
[73] Assignee Bell Telephone Laboratories Incorporated
Murray Hill, N.J.

[54] ELECTRONIC FREQUENCY SWITCHING CIRCUIT FOR MULTIFREQUENCY SIGNAL GENERATOR
2 Claims, 5 Drawing Figs.

[52] U.S. Cl. .......... 179/90 K
[51] Int. Cl. .......... H04m 1/51
[50] Field of Search .......... 179/90 K, 84 UF; 307/205, 210, 239, 242, 248, 251, 284, 304; 331/34, 36, 48, 49, 56, 107; 179/90 BD, 90 B

[56] References Cited

UNITED STATES PATENTS

| | | | |
|---|---|---|---|
| 3,521,141 | 7/1970 | Walton | 307/251 |
| 3,509,375 | 4/1970 | Gormley | 307/251 |
| 3,424,870 | 1/1969 | Breeden et al. | 179/90 |
| 3,428,832 | 2/1969 | Abbott | 307/304 |
| 3,246,173 | 4/1966 | Silver | 307/251 |
| 2,954,551 | 9/1960 | Doucette | 307/304 |
| 3,441,685 | 4/1969 | Wallace | 179/90 |

OTHER REFERENCES

IBM Technical Disclosure Vol. 9, Feb. 1967 " Insulated Gate Field Effect Transistor Circuit"

*Primary Examiner*—Kathleen H. Claffy
*Assistant Examiner*—Tom D'Amico
*Attorneys*—R. J. Guenther and Edwin B. Cave

ABSTRACT: Signal frequency combinations in a multifrequency signal generator are produced selectively by establishing conductive paths through switched insulated-gate field-effect transistors (IGFETS) to connect respective frequency determining elements into the oscillator circuits.

INVENTOR
C. E. RIEHM, JR.
BY [signature]
ATTORNEY

PATENTED OCT 12 1971

3,612,773

SHEET 2 OF 2

ELECTRONIC FREQUENCY SWITCHING CIRCUIT FOR MULTIFREQUENCY SIGNAL GENERATOR

BACKGROUND OF THE INVENTION

1. Field of the Invention

This invention relates to multifrequency signal generators and, more particularly, to signal generator systems that include means for selectively producing coincident pairs of diverse-frequency, oscillatory signal bursts.

2. Description of the Prior Art

Multifrequency signal generators with the capability of producing unique coincident pairs of oscillatory signal bursts in response to an input signal, or in response to the actuation of a switch of the like, are well known, as disclosed for example by L. A. Meacham and F. West in U.S. Pat. No. 3,184,554 issued May 18, 1965. One form of the arrangement shown by Meacham and West is employed commercially as a pushbutton operated dial for a telephone set. Each signal pair generated by the dial includes one signal from a relatively high frequency band and one signal from a relatively low frequency band, and each unique combination is indicative of a dialed digit in accordance with a frequency code.

With the advent of integrated circuitry and thin film techniques has come the realization that modern circuit technology of that type cannot be readily exploited in conventional multifrequency signal generators, owing in part to the need for inductive elements that require a substantial portion of the available circuit-packaging space, and further, owing to the need for mechanical switching. This problem has been solved in part by the multifrequency generator disclosed by R. L. Breeden and R. M. Rickert in U.S. Pat. No. 3,424,870 issued Jan. 28, 1969. The Breeden-Rickert circuit employs an interconnected pair of multistage transistor oscillators each utilizing a respective feedback path that includes only resistive and capacitive circuit elements connected in a twin-T, notch-filter network. Frequency selection is provided by mechanical switches that selectively connect respective ones of the frequency determining resistive elements into the circuit in accordance with the frequency to be generated.

Although the Breeden-Rickert circuit meets the problems formerly posed by the need for inductive elements, the problems raised by mechanical frequency selection switches remain unsolved. Among these problems are the creation of switching transients and noise that result in spurious or distorted signals. Additionally, the mechanical complexity of prior art frequency selection switches is undesirable both from the standpoint of fabrication and from the standpoint of effective space utilization. Moreover, the employment of such switches is of course incompatible with the full exploitation of integrated circuit techniques.

Accordingly, a broad object of the invention is to reduce the number of mechanical frequency selection switches in multifrequency signal generators.

SUMMARY OF THE INVENTION

This object and additional objects are achieved in accordance with the principles of the invention by employing a unique network of electronic switches lieu lieu of the mechanical switches conventionally employed for frequency selection in multifrequency generating circuits.

In one embodiment of the invention, the electronic frequency selecting switches employed are insulated-gate field-effect transistors (IGFETS). Each of the IGFETS is connected across one or more frequency determining resistors in the twin-T, R–C, notch-filter feedback network of a respective one of the oscillator circuits. Selective application of a signal to the gate electrode of one of the IGFET switches shifts the switch from a high impedance to a very low impedance condition, thereby effectively shorting one or more of the frequency determining resistors which effects a change in the output frequency of the associated oscillator.

In accordance with the invention, IGFET devices are also uniquely employed as gate voltage discharging devices for each of the IGFET frequency switches.

DETAILED DESCRIPTION

Figure 1:
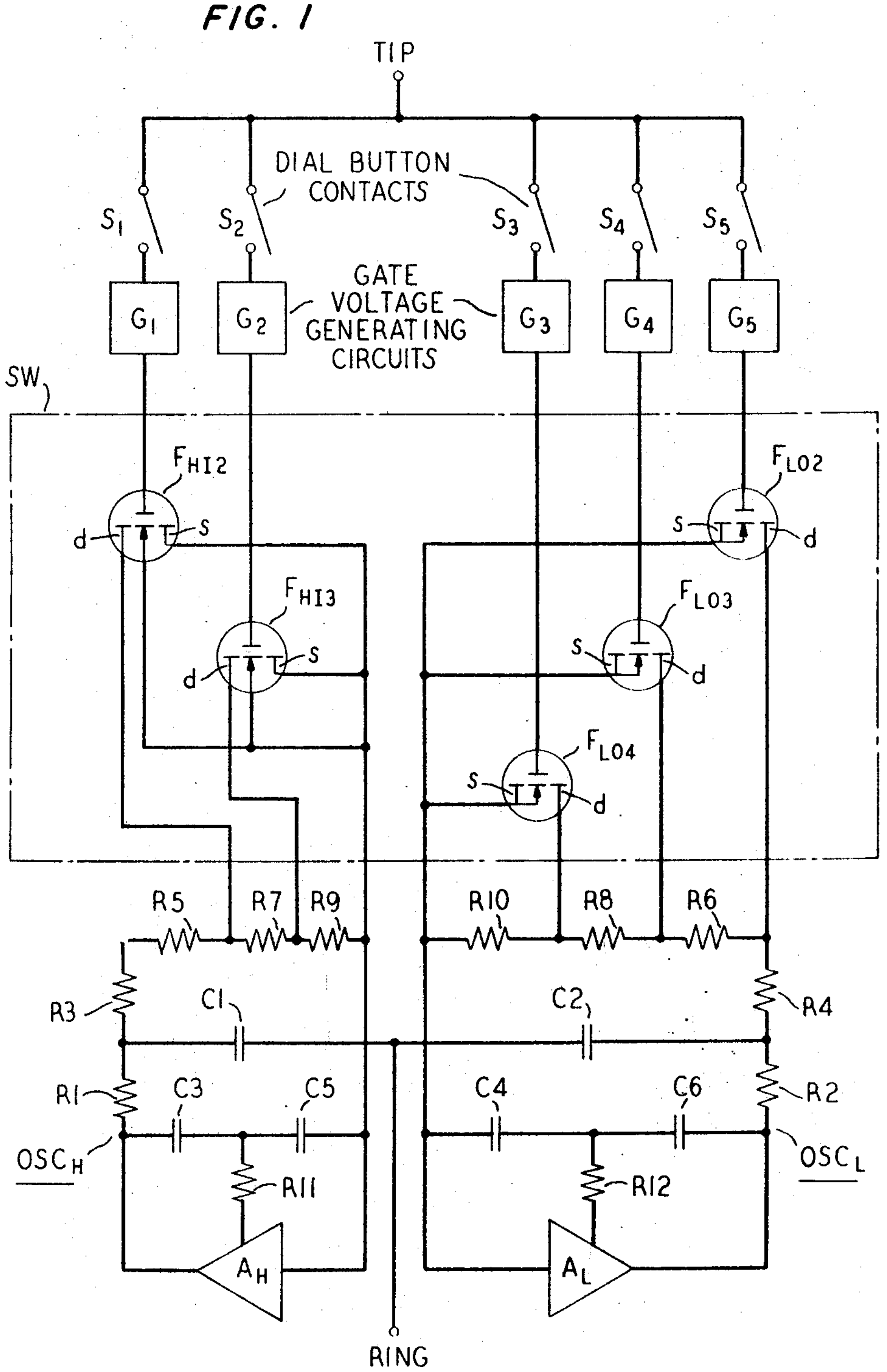
FIG. 1 is a schematic circuit diagram, partially in block form, of a multifrequency generator circuit in accordance with the invention.

As shown in FIG. 1, a multifrequency generator circuit in accordance with the invention includes a high frequency oscillator $OSC_H$ and a low frequency oscillator $OSC_L$ connected across the ring and tip leads of a telephone line. The high frequency oscillator $OSC_H$ includes an amplifier $A_H$ with a twin-T, R–C, notch-filter network in the feedback path. The filter of the high frequency oscillator $OSC_H$ includes resistors R1, R3, R5, R7, R9 and R11 and the capacitors C1, C3 and C5. Similarly, the low frequency oscillator $OSC_H$ includes the low frequency amplifier $A_L$ with a twin-T, R–C, notch-filter network in the feedback path. Elements of the low frequency feedback filter include the resistors R2, R4, R6, R8, R10 and R12 and the capacitors C2, C4 and C6.

The specific requirements for electronic frequency selection switches in the environment of the signal generator shown in FIG. 1 include the ability to operate at the low voltages available on long customer loops which in effect means switches that operate in response to a very low level of drive current. Additionally, an acceptable switch must provide an "ON" resistance that does not exceed approximately 100 ohms and which has an "OFF" resistance in the order of 100 megohms. This range of resistances is indicative of the relatively extreme requirements which must be met if a multifrequency signal generator circuit is to operate effectively in a communication network such as a telephone system. Among the many types of solid state devices that would appear to meet these requirements are bipolar transistor switches. Such switches have provided to be unsuitable, however, inasmuch as they require a floating power supply and frequently introduce problems connected with excessive leakage.

The principles of the invention rest in part on the discovery that IGFET switches, when arranged in the manner illustrated by the switching network SW shown in FIG. 1, meet the requirements indicated. Each of the IGFET switches $F_{H12}$, $F_{H13}$, $F_{L02}$, $F_{L03}$ and $F_{L04}$, shown in FIG. 1, is connected across a particular one or ones of the frequency determining resistors R3 through R10. A switch is turned ON or made to conduct by providing a positive DC gate voltage from a corresponding one of the gate voltage generating circuits G1 through G5. For fully reliable operation the gate voltage should be not less 5 volts greater than the DC voltage on the IGFET source electrodes *s* which are connected to the output of the corresponding notch filter. For ease of identification, the gate electrode of each IGFET is the upper or top electrode, the substrate connection for each is indicated by a small arrow, and the drain electrode for each is designated *d*.

In accordance with the invention, only five switching IGFETS need large employed inasmuch as the lowest frequency in the low frequency oscillator $OSC_L$ and the lowest frequency in the high frequency oscillator $OSC_H$ can be selected by turning on the telephone set common switch (not shown), which operates in response to the depression of any dial pushbutton, and at the same time keeping all IGFET gate voltages low. Thus for the generation of certain frequency combinations, no IGFETS are turned on and either one or both of the oscillators operate with all of the frequency determining resistors in circuit. Such an arrangement saves a significant amount of silicon substrate inasmuch as each IGFET switch must be relatively large in order to achieve the low ON resistance required.

Each of the switches $S_1$–$S_5$ represents a combination of one or more dial button contacts from an otherwise conventional pushbutton telephone dial. Thus the depression of a particular pushbutton (not shown) may be arranged to operate switch $S_1$ and switch $S_4$ so that one frequency from the high frequency band and one frequency from the low frequency band will be generated simultaneously. By way of further example, a low frequency band signal might be generated by the operation of the dial common switch (not shown) and a high frequency band signal might be generated by the operation of switch $S_3$. It is evident that in the embodiment of the invention described herein, the use of mechanical frequency-selecting contacts has not been fully eliminated in that the contacts $S_1$–$S_5$ are employed. It should be noted, however, that these contacts are fully isolated from the actual frequency-determining circuits $OSC_H$ and $OSC_L$ so that most of the advantages of actual contact elimination are in fact achieved. Additionally, it is evident that a circuit in accordance with the invention may be embodied in an environment other than a telephone set, such as a repertory dialer or a card dialer, in which case signal frequency generation may be initiated by electronic logic signals rather than by the operation of the mechanical contacts.

Only about 5 volts (gate-to-source) can be made available from the telephone line to drive the IGFET switches on the longest customer loop, and this value assumes that the dial is used with an active hybrid speech network or has its own DC equalization circuitry. The DC voltage on the TIP lead should therefore be at least 6.5 volts so that the voltage at the notch output (the IGFET source electrodes) is approximately 1.5 volts, providing a difference (gate-source voltage) of at least 5 volts. An ON resistance of 100 ohms at 5 volts is considered necessary to ensure that frequency changes resulting from resistance variations will not exceed 0.1 percent under any condition. Minimizing frequency shift also requires that the device have at least 100 megohms of source-to-drain resistance in the OFF state.

In accordance with the invention, each IGFET switch is designed to remain in the OFF state so long as the gate voltage is less than $V_n+V_t$ where $V_n$ and $V_t$ are the notch DC voltage and the device threshold voltage, respectively, assuming that $V_t\cong+1.0$ volt. No limit on drain-source and gate-drain/source capacitance need be specified, owing to the fact that the capacitances involved are inherently too low to cause undesirable frequency variations.

In accordance with the invention, IGFET switches operating in the *n*-channel enhancement-mode are considered to be particularly advantageous for the use indicated, inasmuch as such devices are compatible with the voltage polarity most readily available to telephone dial signal generators, and further, because the silicon chip size can be made smaller than a chip with suitable *p*-channel devices. The fabrication of the switching IGFETS in network SW can on one or more silicon chips is practical and obviously advantageous. The potential level of the substrates for such chips must be approximately the same as the IGFET source electrodes *s*, however, in order to prevent large changes in the device threshold voltages resulting from source-substrate reverse bias.

In accordance with one embodiment of the invention, one chip comprised of three switches IGFETS is used for each of the oscillators $OSC_L$ and $OSC_H$. As shown in FIG. 1, the substrate of each chip is connected to the associated oscillator notch output which is the lowest AC signal point of the oscillator. Since the DC voltage varies little from notch input to notch output, the source voltage of each IGFET is within approximately 100 millivolts of the substrate.

Additional integration can be achieved by making all IGFETS on a single chip with a common substrate. The substrate is then connected to the notch output of the low (or high) frequency oscillator. This arrangement is possible owing to the face that the voltage difference between high and low frequency notch outputs is too small to affect significantly the IGFET threshold voltages, It should be recognized, however, that the single-substrate configuration results in comparatively large frequency variations owing to the capacitive coupling through the substrate/source and substrate/drain junctions of the IGFETS. From the standpoint of fabrication efficiency, consideration must also be given to the yield factor of the single-substrate configuration versus the three IGFETS per chip configuration.

For the IGFET switches $F_{H12}$, $F_{H13}$, $F_{L02}$, $F_{L03}$ and $F_{L04}$ to perform as designed in the arrangement shown in FIG. 1, the gate voltage-generating circuits $G_1$ through $G_5$ must also satisfy certain conditions. First, the gate voltage must reach the minimum required value within a brief period, such as 5 milliseconds, after a corresponding one of the dial button contacts $S_1$–$S_5$ is closed. Moreover, the gate voltage decay after the dial contact is open must be sufficiently rapid to turn the IGFET switch OFF within a period of approximately 40 milliseconds. Also, as indicated above, each of the $G_1$ through $G_5$ circuits must supply some minimum voltage, such as 6.5 volts, to the IGFET gate on the longest customer loop with the multifrequency dial signal present on the line. However, the amplitude of any AC voltage, such as dial signal voltage, on the IGFET gate must not be high enough to modulate the switch resistance, owing to the necessity for avoiding distortion in the dial signal frequencies.

Figure 2:
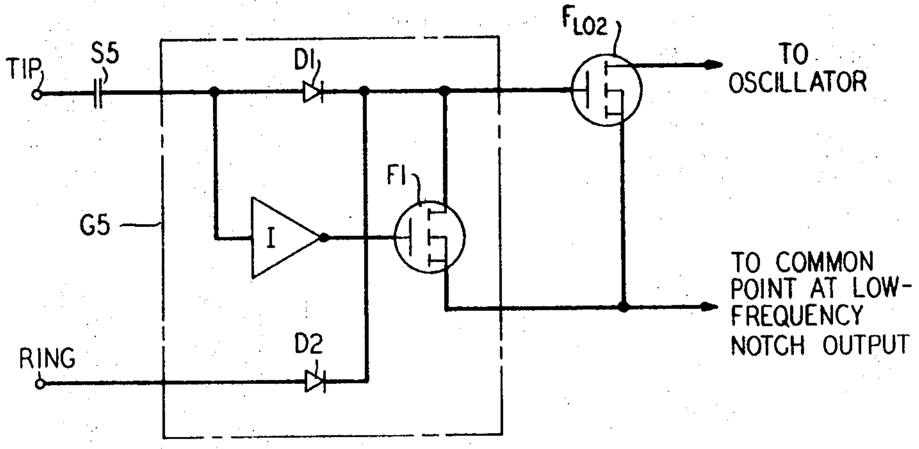
FIG. 2 is a schematic circuit diagram of one of the gate-generating circuits shown in block form in FIG. 1.

The illustrative $G_5$ circuit shown in FIG. 2 meets the requirements indicated and has been designed to operate the electronic frequency switching circuitry from the telephone line on the longest customer loop. This circuit has the further advantage that it may readily be built entirely in silicon monolithic form. To initiate operation, line voltage is applied to the circuit of FIG. 2 by way of the switch $S_5$. A diode D2 acts as a filter capacitor and provides a very high resistance to the RING terminal which is typically grounded, and a diode D1 operates as a low capacitance rectifier. Diodes D1 and D2 provide maximum available voltage to the gate of frequency switching IGFET $R_{L02}$ through peak-rectification of the multifrequency dial signal which is present in the TIP lead. A conventional resistor-diode-capacitor peak-rectifier could be used in place of D1 and D2, but the circuit of FIG. 2, as shown, is fully integrable and therefore is less costly, uses less space and generally outperforms a circuit employing passive components.

A second *n*-channel IGFET, F1, is normally held ON by an inverter I to discharge the associated frequency switching IGFET gate $F_{L02}$ whenever the corresponding dial button contact $S_5$ is open. The device F1 is preferably included on the same chip with the frequency switching IGFET, whereas diodes D1 and D2 and the inverter circuit I may be placed on a separate logic chip.

Figure 3:
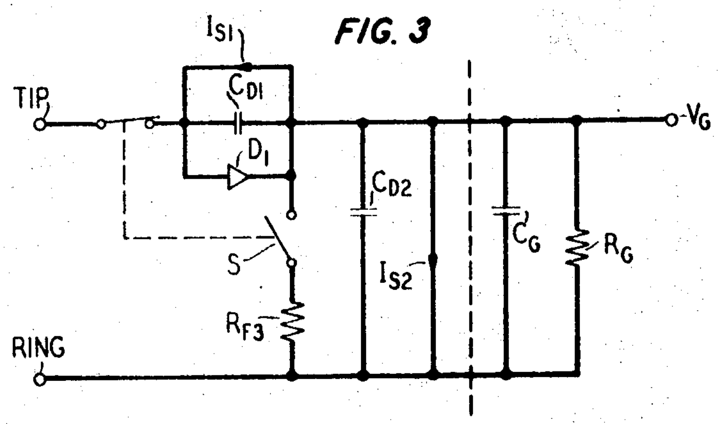
FIG. 3 is a schematic circuit diagram of a circuit equivalent to the circuit of FIG. 2 employed herein to illustrate the principles of operation of the circuit of FIG. 2.
Figure 3A:
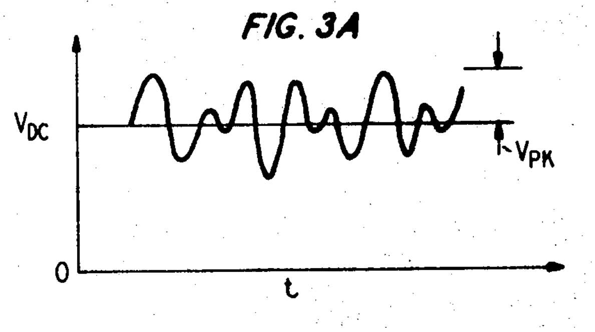
FIG. 3A is a waveform illustrating the input signal applied to the circuit of FIG. 2 or FIG. 3.

The operation of FIG. 2 may also be described in terms of the operation of its equivalent circuit shown in FIG. 3. Owing to the fact that the IGFET gate impedance is relatively high, the gate immediately charges toward the voltage represented by $V_{DC}+V_{PK}$ through the diode D1 when the dial button contact $S_5$ is closed, the relative values of $V_{DC}$ (DC line voltage) and $V_{PK}$ (peak signal voltage) being shown by the illustrative signal plot of FIG. 3A. Diodes D1 and D2, FIG. 2, become back biased and are represented in FIG. 3 by the capacitance $C_{D1}$ and $C_{D2}$ and the leakage currents $I_{S1}$ and $I_{S2}$ of their reverse junctions, plus an ideal diode D1 which conducts in the forward direction. For values of $I_{S1}$ and $I_{S2}$ which are very small, the DC voltage $V_G$ on the IGFET gate will be approximately equal to $V_{DC}+V_{PK}$, as indicated above. Thus, because of the peak-rectification of the finally generated multifrequency signal, the IGFET gate voltage on long loops is typically about 1 volt higher than the line DC voltage $V_{DC}$. This relation provides some degree of margin in the requirement for a minimum value of $V_G$. In FIG. 3, the capacitors $C_{D1}$, $C_{D2}$ and $C_G$ form a voltage divider for the dial signal and, accordingly, the AC voltage $V_g$ on the IGFET gate may be expressed as follows: $V_g=(V_t)\cdot C_{D1}/C_{D1}+C_T$, where $C_T=C_{D2}+C_G$. By making $C_{D2}$ greater than $C_{D1}$, the gate AC voltage can readily be reduced to any level desired. To further reduce the frequency variations due to the AC voltage $V_C$, diode D2 can be replaced with a low-leakage capacitor which has a larger capacitance than $C_{D2}$.

If only the diodes 7 D1 and D2 were used in the circuit of FIG. 2, the requirement for low reverse leakage would conflict with the need to remove the IGFET gate charge in less than 40 milliseconds. Using typical values, an illustrative time interval of $\Delta t$ may be computed as follows:

$$\Delta t=\frac{C\Delta V}{I_S}=\frac{(20\text{ pf})\ (10\text{ volts})}{(10\text{ na})}=20\text{ msec.}$$

Diode reverse leakage currents cannot be well controlled at low reverse voltages, and placing lower limits on this parameter is not feasible for planar devices. Variations in manufacturing processes and in ambient temperatures, however, could easily make $\Delta t$ much larger than 40 milliseconds. Consequently, the *n*-channel IGFET F1 has been included to discharge the IGFET gate quickly when the dial button frequency contact is opened.

The IGFET F1 is turned OFF by the inverter I and peak-rectified TIP voltage is applied to the gate electrode of the frequency switch $F_{L02}$ when the dial button contact is closed. When the $S_5$ contact opens, the inverter output goes high, turning ON F1 and quickly discharging the gate voltage $V_G$. The gate of IGFET F1, which is a very low gain device, need only be held at a voltage greater than $V_n+V_t$ for the short time required to discharge the gate of frequency switching IGFET $R_{L02}$. Note that the input resistance of the inverter can be set so that leakage through the $S_5$ contact will not turn the frequency switching IGFETS ON.

FIG. 2 shows the inverter I in block form. Ideally, the frequency switching IGFETS and the associated "bleeder" or discharge devices, e.g., F1, are fabricated as three sets of two devices each on one silicon chip. It appears that virtually any advanced systems employing IGFET switching, such as card dialer sets, and general purpose telephone sets will provide diodes and an inverter circuit as needed. With the current technology, it does not appear economical to place the diodes D1 and D2 on the IGFET chip. It should also be noted that the inverter arrangement employed will necessarily be dependent on the particular environment in which the set is used. Thus, in one instance the inverter might employ bipolar devices, in another, IGFETS and in still other situations, an inverter may not be required.

Figure 2A:
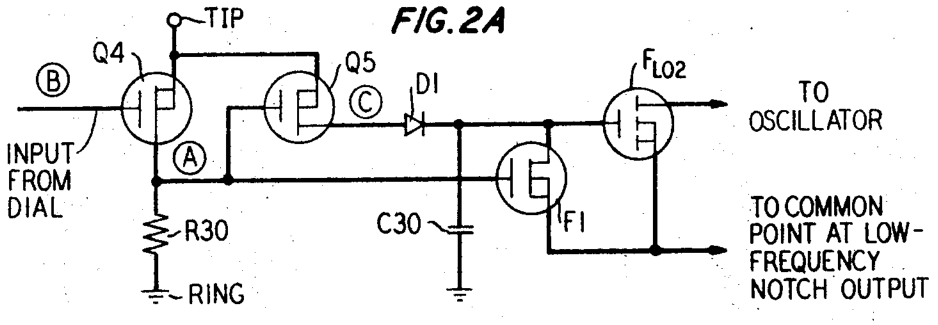
FIG. 2A is a schematic circuit diagram of the inverter shown in block form in FIG. 2.

If an electronic-type dial is operated off the telephone line, however, an inverter is required and its function may be accomplished advantageously by a circuit of the form shown in FIG. 2A which may be fabricated on a separate *p*-channel logic chip with thin film resistors. When the gate electrode Ⓑ of the IGFET Q4 shifts to a relatively high-voltage condition, turns OFF point Ⓐ drops to a low voltage condition, turning OFF the IGFET F1. IGFET Q5 then turns ON, applying TIP voltage to point Ⓒ and the gate $F_{L02}$ through diode D1. The diode D2 of FIG. 2 has been replaced in this instance with a thin film capacitor C30. Whether to employ a diode or a capacitor in a given case is primarily a matter of economics.

It is given to be understood that the embodiment described herein is merely illustrative of the principles of the invention. Various modifications thereto may be effected by persons skilled in the art without departing from the spirit and scope of the invention.

I claim:

1. A multifrequency dial signal greater for a telephone set comprising, in combination:

a plurality of oscillators each including a respective amplifier and a respective twin-T, R–C, filter in the feedback path thereof;

a plurality of groups of IGFET switches each operable in response to the application of a control signal for shorting out a respective one of the frequency determining elements in a respective one of said R–C filters thereby to fix the frequency of the associated one of said oscillators;

means for connecting said oscillators in parallel circuit configuration across the tip and ring terminals of a telephone line;

a plurality of gate voltage-generating circuits each for generating one of said control signals;

a plurality of dial-operated mechanical switches each in series relation between a respective one of said generating circuits and the gate electrode of a corresponding one of said IGFETS:

each of said filters having a respective output point constituting the output point of a corresponding one of said oscillators;

all of said IGFETS in each of said groups being mounted on a respective common substrate;

means connecting each of said substrates to the associated one of said output points;

means connecting each of the source electrodes of said IGFETS to an associated one of said output points; and means connecting the drain electrode of each of said IGFETS to a terminal of a respective one of said frequency determining elements.

2. Apparatus in accordance with claim 1 wherein each of said gate voltage-generating circuits comprises, in combination, first and second input points connectable respectively to said tip and ring terminals means including an IGFET for discharging an associated one of said IGFET switches whenever the corresponding one of said mechanical switches is open, means including a first diode operating as a low capacitance rectifier connected between said first input point and the gate electrode of said last named IGFET, means including a second diode operating as a filter capacitor connected between said second input point and the gate electrode of said last-named IGFET, and an inverter circuit connected between the input terminal of said first diode and the gate